US010542330B2

(12) United States Patent
Hopcraft et al.

(10) Patent No.: US 10,542,330 B2
(45) Date of Patent: Jan. 21, 2020

(54) AUTOMATIC ADAPTIVE NETWORK PLANNING

(71) Applicant: NetScout Systems, Inc, Westford, MA (US)

(72) Inventors: Geoff Hopcraft, Piedmont, CA (US); Burak Berksoy, Alameda, CA (US)

(73) Assignee: NetScout Systems, Inc., Westford, MA (US)

( * ) Notice: Subject to any disclaimer, the term of this patent is extended or adjusted under 35 U.S.C. 154(b) by 247 days.

(21) Appl. No.: 15/609,587

(22) Filed: May 31, 2017

(65) Prior Publication Data

US 2018/0352309 A1 Dec. 6, 2018

(51) Int. Cl.
*H04Q 3/00* (2006.01)
*H04W 16/18* (2009.01)
*H04W 16/10* (2009.01)
*H04L 12/24* (2006.01)

(52) U.S. Cl.
CPC ....... *H04Q 3/0083* (2013.01); *H04L 41/0883* (2013.01); *H04L 41/145* (2013.01); *H04W 16/10* (2013.01); *H04W 16/18* (2013.01)

(58) Field of Classification Search
CPC . H04Q 3/0083; H04L 41/0883; H04L 41/145; H04W 16/10; H04W 16/18
See application file for complete search history.

(56) References Cited

U.S. PATENT DOCUMENTS

| | | | | |
|---|---|---|---|---|
| 6,477,376 | B1* | 11/2002 | Carter | H04W 16/18 455/423 |
| 7,295,960 | B2* | 11/2007 | Rappaport | G06F 17/509 455/403 |
| 7,373,152 | B2* | 5/2008 | Oesterling | H04B 17/20 455/404.2 |
| 7,894,412 | B2* | 2/2011 | Hart | G01S 5/02 370/338 |
| 2005/0149303 | A1* | 7/2005 | Agrawala | G01C 21/367 703/2 |
| 2009/0276265 | A1 | 11/2009 | Ahmed et al. | |
| 2011/0319067 | A1* | 12/2011 | Adams | H04W 16/18 455/422.1 |

\* cited by examiner

*Primary Examiner* — Philip J Chea
*Assistant Examiner* — Robert B McAdams
(74) *Attorney, Agent, or Firm* — Locke Lord LLP; Scott D. Wofsky; Christopher J. Capelli

(57) ABSTRACT

A method for automatic adaptive network planning includes receiving a first list which includes a plurality of potential sites. A set of the network coverage goals and one or more models substantially related to the network coverage are received. A wireless network coverage map is generated for each site based on the received model(s). The coverage map includes a plurality of locations within a corresponding coverage area. For each location and for each site the likelihood of the network coverage goals being realized is calculated using the generated wireless network coverage map. A second list of proposed active sites is automatically generated. The second list includes a subset of the sites included in the first list based on the calculations performed for each location. The second list of the proposed active sites substantially meets the set of network coverage goals.

17 Claims, 4 Drawing Sheets

AUTOMATIC ADAPTIVE NETWORK PLANNING

FIELD OF THE INVENTION

This specification is directed, in general, to computer networks, and, more particularly, to automatic adaptive network planning.

BACKGROUND OF THE INVENTION

Mobile broadband traffic is expected to grow exponentially. The next generation ubiquitous, ultra-high-bandwidth communication system, also known as 5G, will involve network densification to meet the throughput and latency demands that are likely to arise in the future. In 5G communication systems, small cells are expected to carry the majority of traffic. This will generally result in a significant increase in the number of cell sites. In fact, it is expected that positioning of those cell sites in 5G small cell networks can become critical since 5G signals are very strongly affected by clutter (building, trees) as well as small-scale terrain variation.

The high density areas of 5G sites will represent a significant expansion for an operator with a 2G, 3G or 4G network. It may not be possible to use traditional cell towers with fiber optic cable backhaul for every site. Instead of using traditional cell towers, multiple non-traditional sites will be required to provide coverage. Consequently, small cell deployment will become one of the biggest challenges for mobile operators due to the order of magnitude increase in number of sites as compared to the traditional macro cell deployment.

Current telecom networks are based on an architectural model of three classes of network domains: core, metro, and access. A traditional access network design involves an engineer developing a network plan based on modeled coverage from a set of chosen sites. That plan is then given to a site acquisition team. This team negotiates installation rights and determines needs of backhaul to the sites. If a particular site is not available, then a notice (or some other notification) is given back to the planning team. Consequently, in a series of meetings a new proposal is generated. When this process becomes too cumbersome, the site acquisition team may substitute nearby sites for the ones requested in the plan. As another example, a site installation team may move the planned location within the site to enable backhaul, power or accessibility.

This method has some critical challenges in development of an improved 5G communication system. Many of the small non-traditional sites may not be available, or if available may typically have insufficient backhaul. The last hop backhaul for 5G small cells typically should enable a cost-effective deployment in a flexible, organic way, where additional capacity can be injected as required. The backhaul has to meet all the key 5G backhaul requirements such as providing multi-gigabit throughput, having millisecond level of maximum latency, having high availability and reliability, having cost-effective scalability, being easy to deploy, being easy to manage, having dynamic expandability and optimization based on traffic, having a small form factor, and having low TCO (Total Cost of Ownership). Thus, in some cases, hundreds of re-plans may be required to cover a significant market. Furthermore, because of the strong effect of clutter on a 5G signal, a nearby network site location may be a poor substitute for an originally-proposed network site location.

This manual process of network site selection is normally very time consuming and typically requires multiple adaptations. Accordingly, there is a need for an improved automatic method of network planning.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for automatic adaptive network planning includes receiving a first list which includes a plurality of potential sites. A set of the network coverage goals and one or more models substantially related to the network coverage are received. A wireless network coverage map is generated for each site based on the received model(s). The coverage map includes a plurality of locations within a corresponding coverage area. For each location and for each site the likelihood of the network coverage goals being realized is calculated using the generated wireless network coverage map. A second list of proposed active sites is automatically generated. The second list includes a subset of the sites included in the first list based on the calculations performed for each location. The second list of the proposed active sites substantially meets the set of network coverage goals. The second list is updated as needed when the planned locations are moved.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
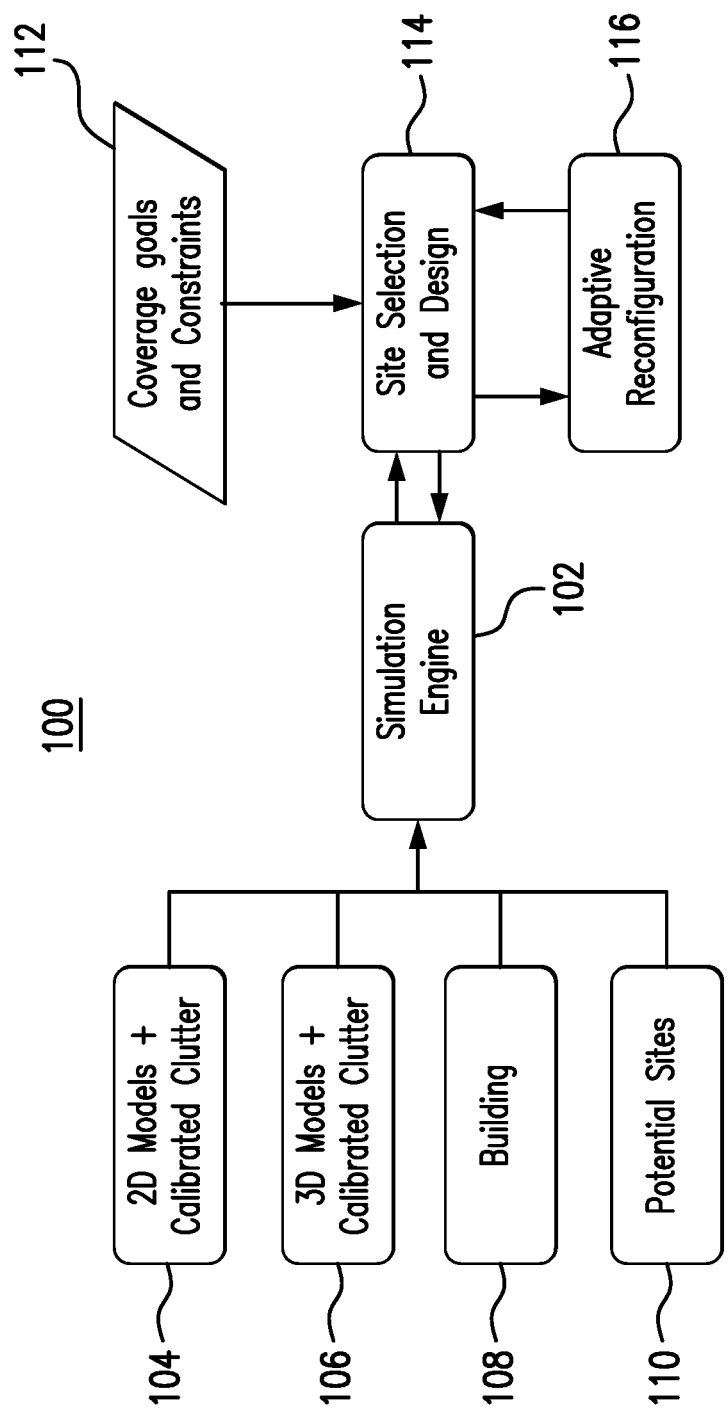
FIG. 1 illustrates a wireless network planning system, according to an embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention relate to automatic adaptive wireless network planning. In an embodiment of the present invention, the network planning system is a software system configured to provide rapid and automated redesign to adapt to sites which cannot be acquired. In this embodiment, the network planning system may present a priority-ordered list of sites to the site acquisition team. The site acquisition team can update the presented list with information about which sites have been acquired, which sites cannot be acquired, which sites have been moved and which sites are available, but do not have wired cable backhaul. The network planning system may subsequently generate a new plan, based on the updated information, to provide appropriate service levels for user-specified wireless coverage area(s) including wireless coverage at ground level and above ground level to a set elevation. In addition, the automatically generated plan ensures that wireless backhaul is available for sites which require it. As described below, the novel automated system is different from a conventional planning solution in that it can substantially reduce time, efforts and cost due to automated planning, and due to ability to change plans without any input from a design engineer. Furthermore, the automated planning system can plan wireless backhaul as needed based on facilitated peer-to-peer communication between cells.

The term "service" as used herein includes the supplying or providing of information over a network, and is also referred to as a communications network service. Examples of services include 5G broadband services, any voice, data or video service provided over a network, smart-grid network, digital telephone service, cellular service, Internet protocol television (IPTV), etc.

FIG. 1 illustrates a wireless network planning system 100, according to an embodiment. In one embodiment, the network planning system 100 includes a simulation engine 102, a two dimensional (2D) calibrated path loss model 104, a three dimensional (3D) calibrated path loss model 106, a building model 108, a list of potential sites 110, service coverage goals and constraints 112, site selection and design module 114 and adaptive reconfiguration module 116. The simulation engine 102 receives inputs, including the list of potential sites 110, which may be entered by a user on a graphical user interface. From these inputs and the models 104-108, the simulation engine 102 simulates the deployment of a communications network service.

As described in more detail later, the calibrated path loss models 104-106 and the building model 108 take into consideration calibration parameters, terrain and signal penetration loss factors across multiple domains that can be used to simulate deploying of a communications network service. These factors are implemented in the models, and these factors when implemented in the models are referred to as model parameters. Relationships between the model parameters are used during the simulations to generate coverage map for deploying the service. Deploying of a service may include building network infrastructure, providing the service, and maintaining the service after it is operational.

Each of the models 104-108 include different model parameters that may be derived from a historical analysis of various communication network service deployments, and also may be derived from a determination of the type of information that is needed to analyze deployment of a service. For example, if a particular type of a transmitter is needed for a service deployment, then the cost of that transmission equipment may be used as a model parameter. The model parameters may include but are not limited to traditional terrain and clutter variables, as well as penetration loss variables that affect the service. The models 104-108 may further include building shell and penetration losses, either statistical or broken down by building type.

The simulation generates values for the model parameters. A value for a model parameter is an instance of the model parameter. For example, if a model parameter is a clutter class parameter representing the local environment then clutter class values may be represented by the number of walls and floors being penetrated by the direct path. The values determined for the factors are estimations based on relationships between the model parameters as well as inputs, such as the changeable parameters and/or other inputs for the simulation.

2D path loss model 104 predicts the path loss a signal encounters inside a building or densely populated areas over distances. In one embodiment, the path loss model is assumed to have been perfectly calibrated over a 2D grid with approximately 6 ft×6 ft grid spacing, for example. 2D path loss model 104 can provide an end-to-end communication propagation evaluation that allows data from multiple sources and formats to be used and combined to provide highly accurate communications propagation estimates within a cluttered environment, such as an urban environment that comprises many closely-clustered buildings/objects of varying dimensions. The predictions can be based on signal levels, data rates and availability using a variety of detailed 2D model data sets as inputs.

Similarly, path loss predictions in the 3D path loss model 106 can be based on signal levels, data rates and availability using a variety of detailed 3D model data sets as inputs. Examples of empirical path loss prediction models 104 and 106 in various embodiments include, but are not limited to, Okumura-Hata model, COST 231-Hata model, CCIR model and LEE model. In these models, the main factors affecting the propagation of radio waves such as distance, antenna height, type and geography are all reflected in the form of a variable in the path loss formula. A good signal path loss model should be able to make appropriate adjustments based on the characteristics of different models of landscapes and communication environment. In one embodiment, the 2D and 3D path loss models 104 and 106, respectively, provide a path loss prediction from a proposed transmitter to a coverage area and provide building penetration losses. Exemplary building penetration losses are typically on the order of 11-20 dB.

The geospatial building model 108 represents a model of the region where the evaluated location exists, e.g., a floor of a building. In other words, the geospatial building model 108 provides statistical measurements indicative of signal path loss and signal penetration loss for each of the buildings situated within a coverage area. The locations of any managed transmitters in the overall region also are known and provided to the building model 108. In one embodiment, the overall area of interest, e.g., a floor of a building, is divided into small area elements. While these one or more area elements may be arbitrarily shaped, in one embodiment, these are rectangular regions, and in another, they are small hexagonal regions. In one embodiment, the building model 108 may include shell loss and penetration loss statistics for a sample of buildings over the area. Note that shell loss statistics can be taken even within a single building, as different locations within a building will have different exposure to windows, reflected signals, etc.

According to an embodiment of the present invention, the list of potential sites 110 may be automatically generated. In one implementation, this list may be generated by the site acquisition team. For example, this list may be supplemented by known available sites from previous work by the site acquisition team. In some embodiments, the list of potential sites 110 may be just an arbitrary list (e.g., substantially all of the street light poles in a particular market). Sites may optionally have expressed costs associated therewith. In such an embodiment, there should be a provided default cost for each potential site. Information about each potential site may also include information indicating whether fiber backhaul is available. Many cellular base stations deployed in conventional networks have used copper wireline backhaul technologies such as T1, E1, DSL, etc. when optical fiber is not available at a given site. However, the recent generations of LTE cellular base stations have backhaul requirements of 100 Mb/s or more, especially when multiple sectors and/or multiple mobile network operators per cell site are considered. Thus, while in some embodiments the fiber backhaul information may be limited to "yes" or "no", in alternative embodiments a cost for fiber optic cable backhaul may be separated from the main potential site cost.

According to an embodiment of the present invention, another set of input parameters, namely a set of coverage goals and constraints 112 may include one or more parameters indicative of what statistically constitutes zone coverage, in terms of target signal strength. For example, coverage goal for a particular cell may be defined as 90-th percentile reference signal received power (RSRP) measurement. With respect to building coverage, the expected coverage may be represented as a percentage of building floor space. At least in some embodiments, building coverage goals may optionally include weighting factors. For example, certain buildings could have higher weighting factor due to higher population or increased estimates of sales likelihood. Furthermore, geographic areas with a high road density or high commercial activity may also be more likely to have higher weighting factors. Thus, geographic features, roads, commercial activity, and the like, can be used to estimate coverage goals and constraints within the given geographic area based on their various characteristics. The constraints are requirements that may be provided by the service provider. The constraints typically must be met by the deployed service. One example of a constraint is a QoS constraint. Another constraint may be a budget constraint.

As noted above, from the aforementioned inputs and the models 104-108, the simulation engine 102 simulates the deployment of a communications network service. The simulation engine 102 generates an analysis of the simulation in a form of a wireless network coverage map for each of the plurality of potential sites. The coverage map includes a plurality of locations within a corresponding coverage area. Furthermore, information associated with each location may comprise information being descriptive of an area, a portion of a building, a building, a portion of a floor, a floor, and a portion of a room, a room or a group of rooms. The location information being descriptive of a portion of a building, portion of a floor or portion of a room may comprise location information of at least one building wall, and/or location information of at least one door or at least one stair. The location information being descriptive of a building, floor or room may comprise information about the form or size of the building, floor or room, window type, window location and window percentage. Furthermore, the coverage map may include position information of an area, a portion of a building, a building, a portion of a floor, a floor, and a portion of a room, a room or a group of rooms. For instance, the position information may include two-dimensional or three-dimensional geo-spatial location information.

In one embodiment, the simulation engine 102 may generate coverage and service quality statistics for each proposed site through binning and storing various components of the simulated measurement data according to virtual bins in a storage array, where the virtual bins may be defined by coverage map geographic locations. The simulation engine 102 may aggregate the measurement data in each virtual bin by computing statistics of the coverage and service quality data assigned to each bin. In one embodiment, these simulated coverage and service statistics may be referenced to as location-based performance measurements, each location-based performance measurement corresponding to statistics computed from at least a portion of simulated measurements assigned to at least one virtual bin. In one aspect, location-based performance measurements can reflect a plurality of statistics computed for each measurement quantity, for example: probability density function (PDF) or cumulative distribution function (CDF) of signal or service quality, maximum signal or service quality, minimum signal or service quality, average signal or service quality (dB, linear), and standard deviation of the signal or service quality (dB, linear). Each virtual bin may include 3D location information. In some embodiments only virtual bins of interest to the coverage goals may be stored by the simulation engine 102 in the storage array. For example, the simulation engine 102 may store building floor space with one vertical virtual bin per building floor. The contextually-related virtual bins may be very sparse relative to a complete binning of the market.

In addition, according to an embodiment of the present invention, the simulation engine 102 utilizes model parameters from both empirical signal path loss models 104 and/or 106 and the geospatial building model 108 to compute and store the probability of meeting the coverage goals for each virtual bin (location) for a particular proposed site. In one embodiment, the simulation engine 102 may not store any virtual bins having less than 10% chance of meeting the provided coverage goals. In addition to site coverage goals statistics, the simulation engine 102 may store statistics related to inter-site communication for any neighbor sites having a greater than 10% chance of meeting the provided goals.

According to an embodiment of the present invention, the site selection and design module 114 is configured to automatically generate a list of proposed active sites. The site selection methodology utilized by the site selection and design module 114 may include preferentially choosing high-net-value sites (described below) and to keep choosing sites until the coverage goals are achieved. Selection of each site by the site selection and design module 114 typically impacts the net values of other sites. Typically, these net values would decrease due to coverage overlap between the automatically chosen site and other potential sites. According to various embodiments of the present invention, the site selection and design software module 114 is configured to find an optimal candidate solution with reasonable performance. A candidate solution is a solution that may be selected to be used to deploy the service. Additional details of the site selection and design module's 114 functionality, as well as details of the adaptive reconfiguration module 116 are described in greater detail below in conjunction with FIG. 3.

Figure 2:
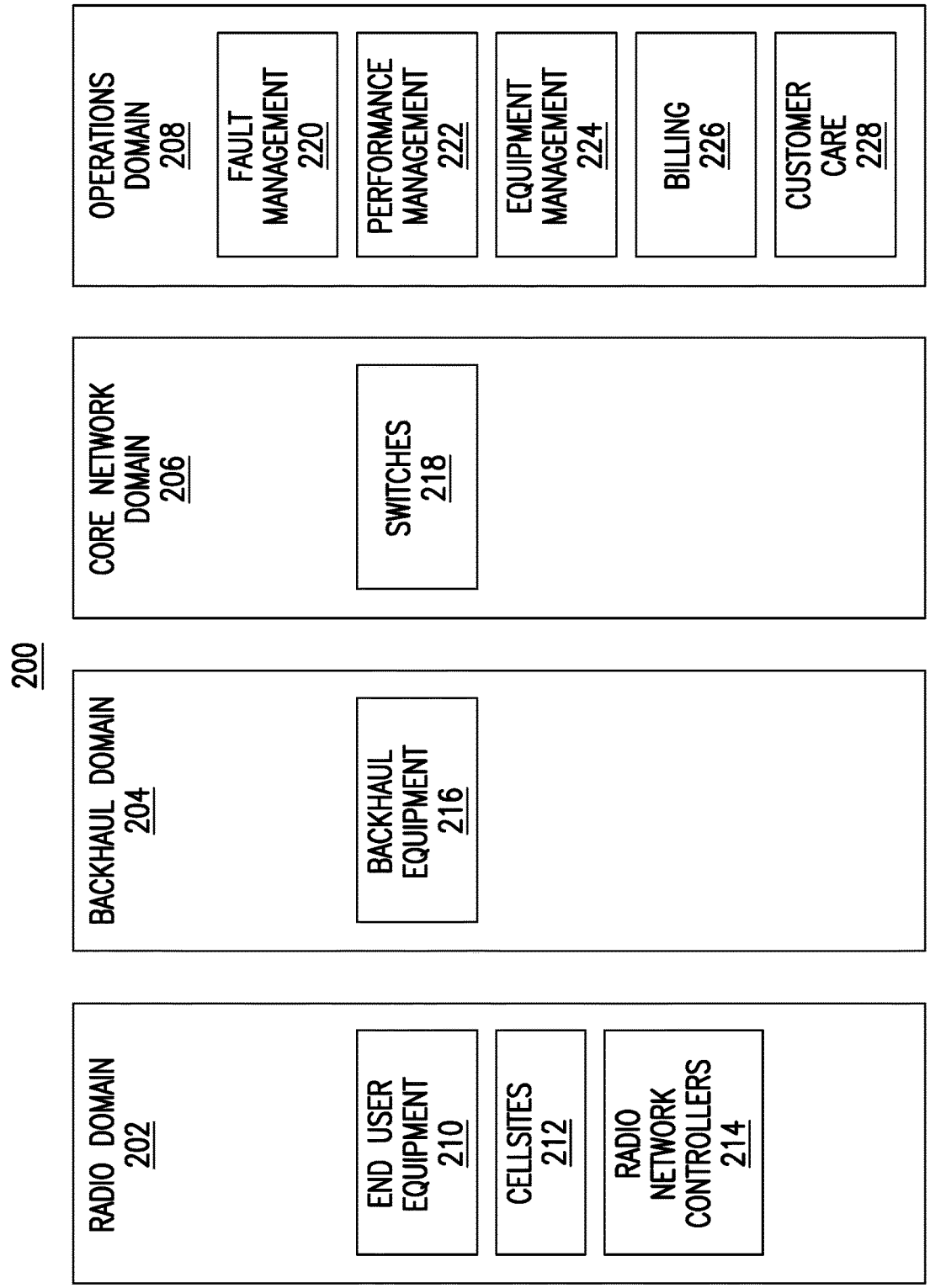
FIG. 2 illustrates domains in a communications network service, according to an embodiment.

FIG. 2 shows different domains for a communications network service deployment, according to an embodiment. In this example, the service being deployed is a 5G service, and thus needs a wireless cellular network as well as a backhaul and core network with connections to the Internet. The 5G service may include providing multimedia applications to the user via a 5G network. The domains include a radio domain 202, a backhaul domain 204, a core network domain 206, and an operations domain 208. The radio domain 202 may include end user equipment 210 with a cellular interface, such as cell phones, laptops, etc. The radio domain 202 may also include cell sites 212, and radio network controllers 214. The backhaul domain 204 includes backhaul equipment 216. This may include controllers and cabling, such as optical fiber carrying data between the cellular network and the core network. The core network domain 206 includes switches 218. The switches 218 may include general packet radio service (GPRS) nodes commonly used for global system for mobile communications (GSM) systems for transmitting Internet Protocol (IP) packets. The operations domain 208 may include multiple systems, such as a fault management system 220, a performance management system 222, an equipment provisioning system 224, a billing system 226, and a customer care system 228, as well as equipment and personnel needed for each system and aspect of operations.

Figure 3:
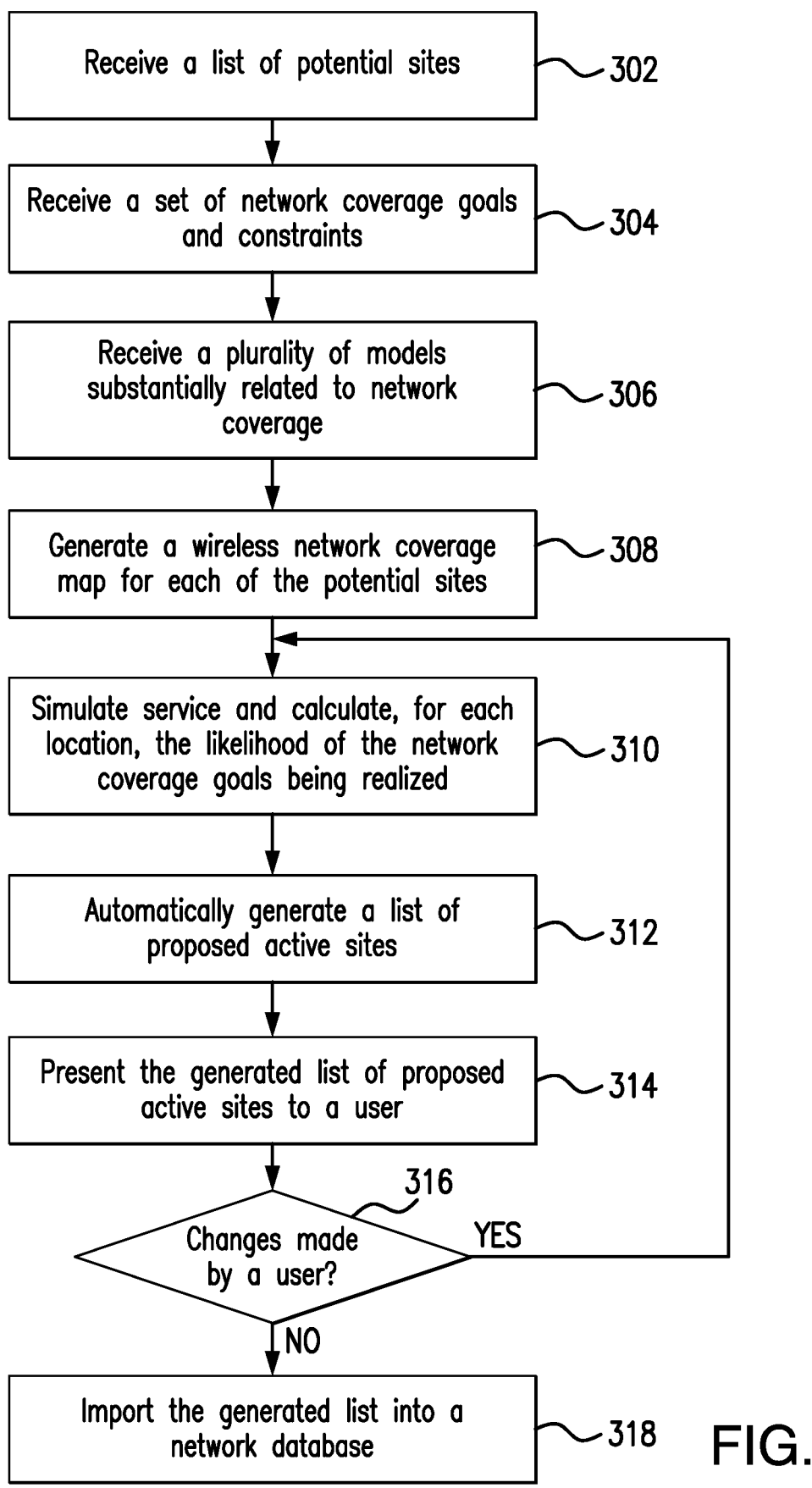
FIG. 3 is a flowchart illustrating a method for automatic adaptive network planning, in accordance with illustrative embodiments of the present invention.

FIG. 3 is a flowchart illustrating a method for automatic adaptive network planning, in accordance with illustrative embodiments of the present invention. Before turning to description of FIG. 3, it is noted that the flow diagrams shown therein is described, by way of example, with reference to components shown in FIGS. 1-2, although these operational steps may be carried out in any system and are not limited to the scenario shown in the aforementioned figure. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

According to an embodiment of the present invention, at step 302, the simulation engine 102 receives the list of potential sites 110 in or near the market of interest. As noted above, clutter data may help to automatically determine the list of suggested sites for installation. In some embodiments, this list may be supplemented by known available sites from previous work by the site acquisition team. In this embodiment, the simulation engine 102 may access a list of known available wireless network sites. In one implementation, this list may be generated by the site acquisition team. Each potential site may be determined based on geo-spatial data and based on a signal quality analysis carried out using a clutter object data set characterizing influences of a plurality of objects present in a vicinity of the potential site on signal propagation. In some embodiments, the list of potential sites 110 may be just an arbitrary list. For example, such list may include all telephone polls in San Francisco.

At step 304, the site selection and design module 114 receives a set of network coverage goals and constraints 112. The received set may include one or more parameters indicative of what statistically constitutes coverage, such as target signal strength. For example, coverage goal for a particular cell may be defined as 90-th percentile RSRP measurement. Constraints include parameters that must be met by the service to be deployed. For example, a certain level of QoS for a service may be required to provide the service, and a budget constraint may identify maximum expenditure.

At step 306, the simulation engine 102 receives a plurality of model parameters representing one or more models 104-108. Such models may include, for example, empirical path loss prediction models (either two dimensional 104 or three dimensional 106) and geospatial building model 108. Examples of empirical path loss prediction models 104 and 106 in various embodiments include, but are not limited to, Okumura-Hata model, COST 231-Hata model, CCIR model and LEE model. In addition, the simulation engine 102 may receive input from the geospatial building model 108, which represents a model of the region where the evaluated location exists, e.g., a floor of a building. In other words, the geospatial building model 108 provides statistical measurements indicative of signal path loss and signal penetration loss for each of the buildings situated within a coverage area. The model parameters may include but are not limited to traditional terrain and clutter variables, as well as penetration loss variables that affect the service. At least some of the models may be provided based on domains shown in FIG. 2.

At step 308, the simulation engine 102 generates a wireless network coverage map for each of the potential sites. In a specific embodiment, the simulation engine 102 may communicate with a mapping service application, such as web based mapping service application (not shown in FIG. 1). The mapping service application may provide map data, including map images, to the simulation engine 102. In one example, the map data includes map image data, such as pixel array and pixel color and intensity, which is used to render the map image on a graphical user interface. In yet another example, the map data includes geographical coordinates for any number of points/locations and/or pixels in the map image. For example, the geographical coordinates can include longitude and latitude coordinates. In still another example, the map data includes the zoom level for a map image. Using the provided map data, the simulation engine 102 may generate coverage and service quality statistics for each proposed site through binning and storing various components of the simulated measurement data according to virtual bins in a storage array, where the virtual bins may be defined by coverage map geographic locations. In this embodiment, the simulation engine 102 may aggregate the measurement data in each virtual bin by computing statistics of the coverage and service quality data assigned to each bin. In one embodiment, these simulated coverage and service statistics may be referenced to as location-based performance measurements. In one example, the simulated RF coverage and/or simulated transmitter placement is included as part of the coverage map data.

At step 310, the simulation engine 102 performs service simulation and calculates, for each location of each site, the likelihood of the network coverage goals being realized. The simulation is performed using the path loss prediction models 104, 106 and/or geospatial building model 108. For example, models 104-108 may store relationships between corresponding model parameters. It should be noted that the simulation engine 102 performs service coverage simulation in order to enable the site selection and design module 114 to perform active site selection. In one embodiment, site selection process may employ global optimization approaches such as simulated annealing and the generic algorithm to find the optimum list of active sites. However, these approaches are too computationally expensive and could be simplified to a greedy optimization. For simplicity, only the purely greedy algorithm will be considered below; however, the general approach can be easily enhanced to support simulated annealing to decide between options as well.

Referring back to step 310, the simulation engine 102 performs reverse lookup from virtual bins to potential sites. It is noted that each virtual bin represents a physically distinct location. For example, the simulation engine 102 may store building floor space with one vertical virtual bin per building floor. According to an embodiment of the present invention, while the simulation engine 102 performs the lookup, it also calculates and pre-caches an expected site value for each potential site. In one embodiment, the simulation engine 102 calculates the expected site value based on the dot product of the location (virtual bin) value and a coverage metric, such as the square of the location coverage percentage. If a potential site does not have fiber, the probability of site coverage is effectively reduced by the square of the probability that backhaul is available to that site (based on other active sites). If sites have expressed costs associated therewith, those costs can be subtracted from the expected site coverage value by the simulation engine 102 as well.

According to an embodiment of the present invention, the simulation engine 102 updates the overall location coverage value every time the site selection and design module 114 adds or removes a site from the list of active sites. The overall location coverage is expressed by the following expression (1):

$$1-\Pi_{active\ sites}(1-P_{S,B}) \qquad (1),$$

where $P_{S,B}$ represents the probability of coverage from site S to location B. The simulation engine 102 also processes and updates the expected site coverage values for all sites that cover that particular location (the reverse lookup makes this an efficient process). It should be noted, when the simulation engine 102 updates the coverage values for active sites, the expected site coverage value of a given active site should be affected by the other sites providing coverage service to the same location, but should not be affected by the coverage service provided by the site itself. In addition if a first active site provides fiber optic backhaul to a second active site, the simulation engine 102 increases the expected site coverage value of the first site by the expected coverage value of the second site (taking into consideration site coverage values of different sites).

Referring back to FIG. 3, at step 312, the site selection and design module 114 automatically generates a list of proposed sites based on simulations/calculations performed by the simulation engine 102. As noted above, in one embodiment the site selection and design module 114 may employ the purely greedy algorithm for site selection purposes. At each step in the algorithm, the site selection and design module 114 identifies the potential site with the highest expected coverage value (calculated by the simulation engine 102) and adds the identified potential site to a list of active sites. It should be noted that after each iteration, the site selection and design module 114 may remove from the list intervening sites having lower expected coverage value than the newly added site. It is understood that this site removal should be done after addition, rather than before, to avoid an endless loop around low-value sites that provide fiber backhaul to high-value sites. According to an embodiment of the present invention, the site selection and design module 114 continues this iterative selection process until it generates a list of active sites that best meet overall user objectives (e.g., coverage goals and constraints 112).

The following example illustrates the site selection process employed by the site selection and design module 114 to generate the list of active sites. Assume that in this example there are 4 potential sites "A"-"D" and 5 locations of interest "1"-"5". Furthermore, assume that the exemplary coverage goal requires capturing at least $250 of value. The coverage of each cell to each location (virtual bin) can be expressed as a sparse matrix represented by below Table 1:

TABLE 1

| Location # | Value | Site A | Site B | Site C | Site D |
|---|---|---|---|---|---|
| 1 | $100 | 38% | 91% | 70% | 13% |
| 2 | $ 90 | 58% | 75% | 44% | |
| 3 | $ 80 | | | 30% | 60% |
| 4 | $ 70 | 37% | 71% | 42% | 75% |
| 5 | $ 60 | 27% | 48% | 56% | 40% |

It is understood that in actual implementation, the sparse matrix may be much larger and much sparser than the sparse matrix shown in Table 1. Using the data above, the simulation engine 102 calculates the expected site value based on the dot product of the location value (shown in 2nd column of Table 1) and the square of the location coverage percentage. More specifically, the simulation engine 102 may calculate the expected value for sites A, B, C and D as shown below:
$A=\$100*0.38^2+\$90*0.58^2+\$70*0.37^2+\$60*0.27^2=\$59$;
$B=\$100*0.91^2+\$90*0.75^2+\$70*0.71^2+\$60*0.48^2=\$184$;
$C=\$100*0.7^2+\$90*0.44^2+\$80*0.3^2+\$70*0.42^2+\$60*0.56^2=\$105$; and
$D=\$100*0.13^2+\$80*0.6^2+\$70*0.75^2+\$60*0.4^2=\$79$
At this point in process, the site selection and design module 114 evaluates expected values for each site, identifies site B as the site having the highest expected value and adds site B to the active sites list and reports the selection to the simulation engine 102. While in the illustrated embodiment, the site selection and design module 114 performs a selection based on a single criterion (expected coverage value), alternative embodiments contemplate that the site selection and design module 114 may use additional criteria for selecting a particular site, such as, but not limited to, acquisition costs and backhaul availability.

In response to receiving the selected site, the simulation engine 102 is configured to initiate re-calculation of inactive sites' expected values based on the new coverage needs as illustrated in the following Table 2:

TABLE 2

| Location# | Value | Adjusted | Site A | Site B | Site C | Site D | Active |
|---|---|---|---|---|---|---|---|
| 1 | $100 | $ 9 | 38% | 91% | 70% | 13% | 91% |
| 2 | $ 90 | $23 | 58% | 75% | 44% | | 75% |
| 3 | $ 80 | $80 | | | 30% | 60% | |
| 4 | $ 70 | $20 | 37% | 71% | 42% | 75% | 71% |
| 5 | $ 60 | $31 | 27% | 48% | 56% | 40% | 48% |

The last column in table 2 shows coverage provided by currently active sites (just site B in this case). The adjusted value column in table 2 shows remaining values taking into consideration currently active coverage. In other words, the adjusted value for the first location can be calculated as $100-$100*0.91=$9, the adjusted value for the second location can be calculated as $90-$90*0.75=$23, etc. There is less value for other sites in covering locations that site B already covers well, so the simulation engine 102 recalculates the values of inactive potential sites whenever they overlap with coverage provided by site B. This time, using the updated data in Table 2 above, the simulation engine 102 calculates the expected site value based on the dot product of the adjusted location value (shown in 3rd column of Table 1) and the corresponding square of the location coverage percentage. More specifically, the simulation engine 102 may recalculate the expected value for sites A, C and D as shown below:
$A=\$9*0.38^2+\$23*0.58^2+\$20*0.37^2+\$31*0.27^2=\$14$;
$C=\$9*0.7^2+\$23*0.44^2+\$70*0.3^2+\$20*0.42^2+\$31*0.56^2=\$29$; and
$D=\$9*0.13^2+\$70*0.6^2+\$20*0.75^2+\$31*0.4^2=\$42$ It is noted that the value of B is not affected by its own coverage and thus it remains at $184. It is further noted that after first round of calculations by the simulation engine 102, site C had the second highest expected value ($105). However, because of significant overlap in coverage between sites B and C, the value of site C is substantially reduced ($29) once site B is chosen to be added to the active site list. Inactive site specific recalculation results indicate that site D offers good coverage to locations which site B does not reach. At this point in process, the site selection and design module 114 evaluates recalculated expected values for each inactive proposed site, identifies site D as the site having the highest expected value ($42), adds site D to the active sites list and again reports the selection to the simulation engine 102.

In response to receiving another selected site, the simulation engine 102 is configured to initiate yet another re-calculation of expected values based on the new coverage needs after both sites B and D become active as illustrated in the following Table 3:

TABLE 3

| Location # | Value | Adjusted | Site A | Site B | Site C | Site D | Active |
|---|---|---|---|---|---|---|---|
| 1 | $100 | $ 8 | 38% | 91% | 70% | 13% | 92% |
| 2 | $ 90 | $23 | 58% | 75% | 44% | | 75% |
| 3 | $ 80 | $32 | | | 30% | 60% | 60% |
| 4 | $ 70 | $ 5 | 37% | 71% | 42% | 75% | 93% |
| 5 | $ 60 | $19 | 27% | 48% | 56% | 40% | 69% |

As shown in table 3, combination of sites B and D provide 92%, 78%, 65%, 93% and 69% wireless coverage for locations 1-5, respectively. The adjusted value column in Table 3 shows remaining values taking into consideration currently active coverage. In other words, the adjusted value for the first location can be calculated as $100-$100*0.92=$8, the adjusted value for the second location can be calculated as $90-$90*0.78=$20, etc. This time, using the updated data in Table 3 above, the simulation engine 102 recalculates the expected site value based on the dot product of the adjusted location value (shown in 3rd column of Table 3) and the corresponding square of the location coverage percentage, as explained above. However, in this case, the calculation of site B's expected value includes a discount for a value of site D, expected value of site D includes a discount for a value of site B, while the values of inactive sites A and C are discounted by both values of sites B and D. As a result of this recalculation step, the simulation engine 102 determines expected values for sites A-D to be equal to $11, $140, $18 and $45, respectively. As noted above, the site selection and design module 114 may remove from the list substantially all intervening sites having lower expected coverage value than the newly added site. However, in this case, the expected value of site B is still higher than the expected value of site D. Therefore, the site selection and design module 114 keeps both sites in the active list.

According to an embodiment of the present invention, in addition to determining whether the sites with lower expected values should be removed from the list, the site selection and design module 114 is configured to check whether the coverage goals have been met after each iteration. Continuing with the example above, after adding site D to the list of active sites, the site selection and design module 114 may calculate the combined expected value of all active sites. In this exemplary case, the site selection and design module 114 determines the combined expected value of all active sites based on the dot product of the location value (shown in 2nd column of Table 3) and the square of the location coverage percentage provided by the active sites (column 8 of Table 3). The result of this calculation yields the expected value of active sites to be equal $253. Since this value exceeds the provided coverage goal ($250), the site selection and design module 114 terminates the selection process. Thus, in this exemplary scenario the site selection and design module 114 selects sites B and D as proposed active sites.

While the above description of iterative steps 310 and 312 illustrates only purely greedy algorithm, in alternative embodiments, this approach can be easily enhanced to support simulated annealing to decide between selection options. Simulated annealing is a stochastic optimization algorithm, which can be robust to the presence of local maxima. A problem-independent implementation of a simulated annealing algorithm is described in "A General Purpose Distributed Implementation of Simulated Annealing" by R Diekmann, R Luling and J Simon, published in PARALLEL AND DISTRIBUTED PROCESSING, 1992, PROCEEDINGS OF THE FOURTH IEEE SYMPOSIUM ON ARLINGTON, Tex., USA 1-4 Dec. 1992, NEW YORK, N.Y., USA, IEEE, US, 1 Dec. 1992 (1992-12-01), pages 94-101. According to an embodiment of the present invention, in order to implement the simulated annealing process the site selection and design module 114 may add a random variable expressed as Gaussian with a zero mean and standard deviation $\sigma$ to each site (either active or inactive) when making a decision what sides to add and remove at each step. In this embodiment, the site selection and design module 114 re-instantiates this random variable associated with each potential site at every iteration. According to an embodiment of the present invention, at each iteration of step 312 the site selection and design module 114 slightly reduces the value of the random variable. In this embodiment, the site selection and design module 114 does not consider the network coverage goal met until the standard deviation ($\sigma$) of the rate of coverage change is reduced below a predefined threshold value.

In addition, at least in some embodiments, once the site selection and design module 114 identifies a list of proposed active sites it may consider some minor attribute variations. For example, one of the proposed sites may call for a 10 meter height from ground level, but may also note that a range of approximately 8 meters to approximately 10 meters is available. In this scenario, the simulation engine 102 may conduct additional simulations at particular variations of this attribute (e.g., 8 m, 9 m and 10 m) for this particular potential site. Essentially, if any of the additional simulation results increase the combined expected value of active sites, then this result is included in a recommended active site in the list. However, it should be noted that incorporating an optimization across minor attribute variations may not be necessary for the simulation engine 102. If that level of fidelity is desired, and the network planning system 100 has sufficient computational resources, then the minor variations may also be included as distinct sites in the original list of potential sites received by the simulation engine 102 at step 302.

According to an embodiment of the present invention, the list automatically generated by the site selection and design module 114 may comprise a priority ordered list sorted by expected site values. Thus, the highest value sites may appear at the top of the list, and a site which provides wireless backhaul to a second site may have higher priority than the second site. According to an embodiment of the present invention, once generation of the list of active sites is complete, the site selection and design module 114 may sent the generated prioritized list to the adaptive reconfiguration module 116.

Referring back to FIG. 3, at step 314, the adaptive reconfiguration module 116 may present the automatically generated proposed list of active sites to a user, via a graphical user interface (GUI), for example. In one embodiment, the generated prioritized list may be presented to a site acquisition team. The site acquisition team may attempt to acquire the sites in proposed priority order. In an embodiment, the GUI may present the proposed list of active sites along with a wireless network coverage map corresponding to the list of active sites, site details and expected site values, preferably ordered by the site values. In addition to presenting the list, the adaptive reconfiguration module 116 may present to a user one or more options, such as, but not limited to, acquiring the site with backhaul, acquiring the site without backhaul, moving the site to the actual acquired location, rejecting the site, etc.

After presenting a menu of available options, at step 316, the adaptive reconfiguration module 116 determines whether the user made any changes (e.g., by picking any of the presented options). In response to determining that the user made changes (decision block 316, yes branch), the adaptive reconfiguration module 116 performs adaptive reconfiguration by simulating an effect of the user selected change on the proposed list of active sites. In one embodiment, the adaptive reconfiguration module 116 reruns at least some of the simulations/calculations performed at steps 310, 312. For example, if one of the proposed active sites is moved, then the adaptive reconfiguration module 116 recalculates path loss and wireless network coverage based on the new 3D coordinates. In one embodiment, the adaptive reconfiguration module 116 communicates 3D coordinates of the new site to the site selection and design module 114, which in turn sends a request to the simulation engine 102 to recalculate path loss based on the newly provided parameters. As noted above, the simulation engine 102 determines path loss based on the 3D path loss model 106.

Additionally, if the adaptive reconfiguration module 116 detects (at step 316) any differences between the already acquired site and corresponding proposed active site in the presented list (e.g., if the planned site is moved, unexpectedly includes backhaul, unexpectedly lacks backhaul or is rejected), then the adaptive reconfiguration module 116 immediately initiates rerun of the planning routine by requesting the simulation engine 102 and the site selection and design module 114 to perform steps 310 and 312, respectively, to calibrate for the detected differences. If any of the proposed active sites had been acquired already, the adaptive reconfiguration module 116 sends that information to the site selection and design module 114. The site selection and design module 114 performs site selection as described above using the current list of acquired and planned active sites, except in this case the already acquired sites are locked and will not be removed from the list as long as their expected value is positive. By performing step 312 the site selection and design module 114 generates a new prioritized list of planned active sites. In an embodiment, each active site included in the generated list may have a unique ID associated therewith, which remains substantially constant when the site selection and design module 114 reorders the site list. In one embodiment, the site selection and design module 114 may generate IDs based on the order in the proposed prioritized active site list. It should be noted that once the adaptive reconfiguration module 116 presents a particular active site to a user, that site should preferably remain on the list. Even if that particular site has not been acquired yet, it might be an object of an ongoing negotiation process. To accomplish this, in one embodiment, the site selection and design module 114 may automatically increase the computed expected value by a predefined configurable value for all active sites which have been displayed to the user. However, if a particular site has a significant drop in expected value (such as a site that no longer has backhaul or duplicates network coverage of another moved site), the site selection and design module 114 is configured to remove such site from the generated proposed list.

According to an embodiment of the present invention, steps 312-314 may be iteratively performed until users make no further changes. In response to determining that no further changes are made (decision block 316, "No" branch) and, optionally, in response to determining that all proposed sites included in the list have been acquired, at step 318, the adaptive reconfiguration module 116 may import the final list into a network database of record for the network operator (e.g., a planning tool database).

Figure 4:
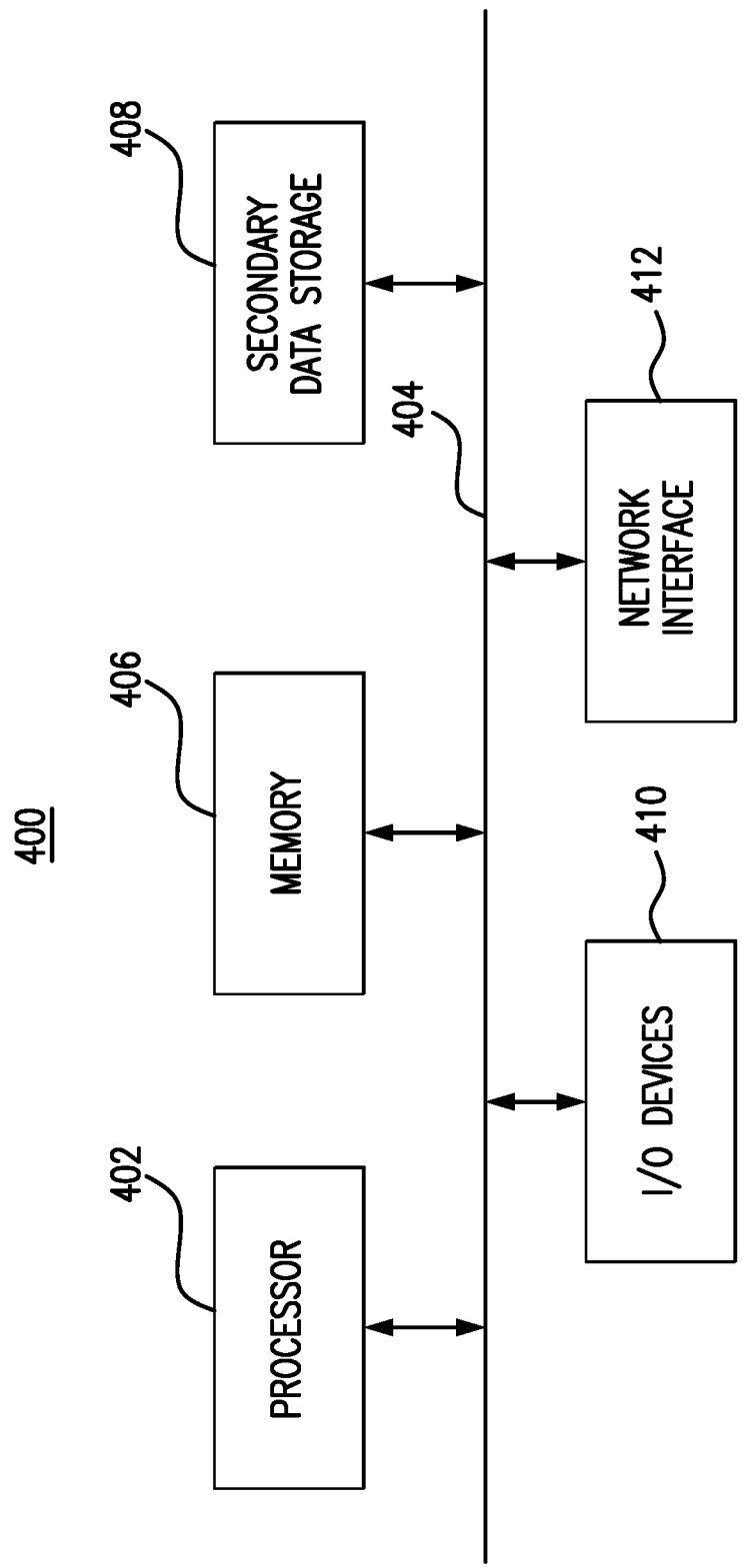
FIG. 4 illustrates a computer system that may be used as a platform for the wireless network planning system and executing various functions, according to an embodiment.

FIG. 4 illustrates a computer system 400 that may be used as a platform for the +network planning system and executing various functions, according to an embodiment. The computer system 400 represents a generic platform that includes components that may be in a server or other computer system. The computer system 400 may be used as a platform for executing one or more of the methods, functions, and steps described herein. These steps may be embodied as software stored on one or more computer readable storage mediums.

The computer system 400 includes a processor 402 that may implement or execute software instructions performing some or all of the methods, functions and other steps described herein. Commands and data from the processor 402 are communicated over a communication bus 404. The computer system 400 also includes a main memory 406, such as a random access memory (RAM), where the software and data for processor 402 may reside during runtime, and a secondary data storage 408, which may be non-volatile and stores software and data. The memory and data storage are examples of computer readable storage mediums.

The computer system 400 may include one or more I/O devices 410, such as a keyboard, a mouse, a display, etc. The computer system 400 may include a network interface 412 for connecting to a network. It will be apparent to one of ordinary skill in the art that other known electronic components may be added or substituted in the computer system 400.

The models 104-108 in the network planning system 100 may be stored in a database provided in the secondary data storage 408. The simulation engine 102, site selection and design module 114 and the adaptive reconfiguration module 116 may be executed by the processor 402 to generate the list of proposed active sites. Also, a GUI for the network planning system 100 may be generated by the processor 402 and presented using the I/O device 410. The user interface can output the generated list of proposed active sites along with corresponding wireless network coverage maps and can receive user input, which may include the list of potential sites 110, coverage goals and constraints 112 and user's selection of presented menu options.

One or more of the steps of the methods described herein and other steps described herein and one or more of the components of the systems described herein may be implemented as computer code stored on a computer readable storage medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable storage medium include conventional computer system RAM (random access memory), ROM (read only memory), EPROM (erasable, programmable ROM), EEPROM (electrically erasable, programmable ROM), hard drives, and flash memory.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic adaptive network planning, the method comprising steps of:

receiving a first list comprising a plurality of potential sites;

receiving a set of network coverage goals for a wireless network and receiving a plurality of models substantially related to the network coverage;

generating a wireless network coverage map for each site of the plurality of potential sites based on the plurality of received models, the coverage map comprising a plurality of locations within a corresponding coverage area;

calculating, for each location of the plurality of locations for each site of the plurality of sites, the likelihood of the network coverage goals being realized using the generated wireless network coverage map including generating a site coverage value for each of the plurality of potential sites and wherein calculating a location coverage value for each location of the plurality of locations for each site and calculating the site coverage value is based on a vector dot product of the location coverage value and the square of an overall location coverage percentage; and automatically generating a second list of proposed active sites comprising a subset of the sites included in the first list based on the calculations performed for each location of the plurality of locations, wherein the second list of proposed active sites substantially meets the set of network coverage goals.

2. The method of claim 1, wherein at least some of the plurality of potential sites are communicatively connected to the wireless network via at least one network backhaul connection and wherein each site included into the second list is communicatively connected to the wireless network via either at least one direct network backhaul connection or via a connection to another active site communicatively connected to the wireless network via at least one network backhaul connection.

3. The method of claim 1, wherein the plurality of models comprise a calibrated signal path loss model providing terrain path loss prediction for a signal travelling from a proposed transmitter to a corresponding coverage area and a geospatial building model providing statistical measurements indicative of signal path loss and signal penetration loss for each of one or more buildings situated within the corresponding coverage area.

4. The method of claim 1, wherein the step of receiving the first list comprises automatically generating the first list of the potential sites and wherein each potential site is determined based on geospatial data and based on a signal quality analysis carried out using a clutter object data set characterizing influences of a plurality of objects present in a vicinity of the potential site on signal propagation.

5. The method of claim 1, wherein the step of automatically generating the second list comprises iteratively recalculating, responsive to selecting a potential site into the second list of active sites, the site coverage value for each of the plurality of potential sites remaining in the first list.

6. The method of claim 5, further comprising sorting the generated site coverage values in a descending order.

7. The method of claim 1, wherein the overall location coverage percentage is calculated according to the following expression $1-\Pi_{active\ sites}(1-P_{S,\ B})$, where $P_{S,\ B}$ is the probability of coverage from site S to location B.

8. The method of claim 5, wherein the step of selecting the potential site into the second list of active sites comprises selecting from the plurality of potential sites one or more sites having the highest site coverage value.

9. The method of claim 5, wherein the step of selecting the potential site into the second list of active sites further comprises selecting one from the plurality of potential sites based on site acquisition costs or site backhaul availability.

10. The method of claim 9, wherein at least a first of the potential sites selected into the second list is selected by applying a greedy optimization strategy.

11. The method of claim 1, further comprising adjusting one or more attributes associated with at least one of the plurality of the potential sites, adding the at least one site having adjusted attributes to the first list and automatically regenerating the second list based on the updated first list.

12. The method of claim 6, further comprising presenting a sorted second list and a menu of available options to a user via a graphical user interface, wherein the second list is sorted based on the calculated site coverage value.

13. The method of claim 12, further comprising iteratively recalculating, responsive to user selecting an option from the presented menu, the site coverage value for each of the plurality of potential sites remaining in the first list.

14. A system for automatic adaptive network planning, the system comprising:

a calibrated signal path loss model providing terrain path loss prediction for a signal travelling from a proposed transmitter to a corresponding coverage area;

a geospatial building model providing statistical measurements indicative of signal path loss and signal penetration loss for each of one or more buildings situated within the corresponding coverage area;

a planning repository for storing network planning data; and an information processing system comprising a processor and a memory device coupled to the processor in communication with the calibrated signal path model, the geo spatial building model and with the planning repository, the memory device containing a set of instructions that, when executed by the processor, cause the processor to:

receive a first list comprising a plurality of potential sites;

receive a set of network coverage goals for a wireless network and receive a plurality of model parameters substantially related to the network coverage from the calibrated signal path model and the geospatial building model;

generate a wireless network coverage map for each site of the plurality of potential sites based on the plurality of received model parameters, the coverage map comprising a plurality of locations within a corresponding coverage area;

calculate, for each location of the plurality of locations for each site of the plurality of sites, the likelihood of the network coverage goals being realized using the generated wireless network coverage map; and automatically generate a second list of proposed active sites comprising a subset of the sites included in the first list based on the calculations performed for each location of the plurality of locations, wherein the second list of proposed active sites substantially meets the set of network coverage goals;

generate a site coverage value for each of the plurality of potential sites and iteratively recalculate, responsive to selecting a potential site into the second list of active sites, the site coverage value for each of the plurality of potential sites remaining in the first list; and calculate a location coverage value for each location of the plurality of locations for each site and calculate the site coverage value based on a vector dot product of the location coverage value and the square of an overall location coverage percentage.

15. The system of claim 14, wherein at least some of the plurality of potential sites are communicatively connected to the wireless network via at least one network backhaul connection and wherein each site included into the second list is communicatively connected to the wireless network via either at least one direct network backhaul connection or via a connection to another active site communicatively connected to the wireless network via at least one network backhaul connection.

16. The system of claim 14, wherein the set of instructions that cause the processor to receive the first list further cause the processor to automatically generate the first list of the potential sites and wherein each potential site is determined based on geospatial data and based on a signal quality analysis carried out using a clutter object data set characterizing influences of a plurality of objects present in a vicinity of the potential site on signal propagation.

17. The system of claim 14, wherein the set of instructions further causes the processor to store the generated second list in the planning repository.

* * * * *